(12) United States Patent
Klein

(10) Patent No.: US 10,499,618 B2
(45) Date of Patent: Dec. 10, 2019

(54) SYSTEM FOR FEEDING AND PHOTOGRAPHING WILDLIFE

(71) Applicant: John Christopher Klein, Bella Vista, AR (US)

(72) Inventor: John Christopher Klein, Bella Vista, AR (US)

(73) Assignee: Explore Scientific, LLC, Springdale, AR (US)

( * ) Notice: Subject to any disclaimer, the term of this patent is extended or adjusted under 35 U.S.C. 154(b) by 93 days.

(21) Appl. No.: 15/365,749

(22) Filed: Nov. 30, 2016

(65) Prior Publication Data

US 2017/0195551 A1  Jul. 6, 2017

Related U.S. Application Data

(60) Provisional application No. 62/387,766, filed on Jan. 4, 2016.

(51) Int. Cl.
| | |
|---|---|
| *A01K 39/01* | (2006.01) |
| *A01K 39/012* | (2006.01) |
| *A01K 29/00* | (2006.01) |
| *H04N 7/18* | (2006.01) |
| *H04N 5/907* | (2006.01) |
| *H04N 5/77* | (2006.01) |

(52) U.S. Cl.
CPC ........ *A01K 39/0106* (2013.01); *A01K 29/005* (2013.01); *A01K 39/012* (2013.01); *H04N 5/772* (2013.01); *H04N 5/907* (2013.01); *H04N 7/188* (2013.01)

(58) Field of Classification Search
CPC .............. A01K 39/0106; A01K 39/012; A01K 29/005; H04N 7/188; H04N 5/907; H04N 5/772
See application file for complete search history.

(56) References Cited

U.S. PATENT DOCUMENTS

| | | |
|---|---|---|
| 5,168,830 A | 12/1992 | Deglis |
| 5,483,922 A | 1/1996 | Hall |
| 5,904,330 A | 5/1999 | Mancio et al. |
| 6,269,711 B1 | 8/2001 | Cotter |
| 7,149,422 B2 | 12/2006 | Schnell |
| 7,848,637 B1 | 12/2010 | Liew |
| 8,050,551 B2 | 11/2011 | Peterson et al. |
| 8,482,613 B2 | 7/2013 | Kempf et al. |

(Continued)

OTHER PUBLICATIONS

Verstraeten et al. "Webcams for Bird Detection and Monitoring: A Demonstration Study", dated Apr. 8, 2010.

(Continued)

*Primary Examiner* — Joseph G Ustaris
*Assistant Examiner* — Jill D Sechser
(74) *Attorney, Agent, or Firm* — James L. Neal

(57) ABSTRACT

Apparatus for feeding and photographing birds and other wildlife includes a housing defining one or more feeding stations. A module containing a sensor to detect the presence of birds and a camera is configured so that the sensor and the camera have overlapping fields of view. Mounting structures on the housing locate the module with respect to the one or more feeding stations to position the sensor and camera so that the area surrounding one or more of the feeding stations is within the fields of view of the sensor and the camera.

9 Claims, 4 Drawing Sheets

(56) References Cited

U.S. PATENT DOCUMENTS

| | | | |
|---|---|---|---|
| 9,247,719 | B1 | 2/2016 | Bennett et al. |
| 2005/0035858 | A1 | 2/2005 | Liu |
| 2007/0036535 | A1 | 2/2007 | Chee |
| 2009/0067676 | A1 | 3/2009 | Kempf |
| 2011/0180004 | A1 | 7/2011 | Humphries |
| 2011/0279683 | A1 | 11/2011 | Yarmchuk |
| 2012/0048203 | A1 | 3/2012 | Bonham |
| 2014/0291327 | A1* | 10/2014 | Messerschmidt ...... B65D 25/22 220/475 |
| 2014/0313406 | A1* | 10/2014 | Becker ................ H04N 5/2251 348/374 |
| 2015/0181801 | A1 | 7/2015 | Niemela |
| 2016/0106072 | A1* | 4/2016 | Bennett .............. A01K 39/0206 119/51.02 |
| 2016/0156989 | A1* | 6/2016 | Lovett ................... H04N 7/183 348/143 |
| 2016/0277688 | A1* | 9/2016 | Gaskamp .............. H04N 5/332 |
| 2016/0366319 | A1* | 12/2016 | Perkins ................ H04N 5/2257 |

OTHER PUBLICATIONS

Kulkarni et al. "The Case for Multi-tier Camera Sensor Networks", dated 2005.
Cantos et al. "Application of Sensors and Thermal Cameras for the Census of Winter Roosts of Birds", dated 1999.
Berkshire Maker Kids Smart Bird Feeder. Smart Feeder Technology (Project #1, Post #3) Publication: Sep. 28, 2014 www.berkshiremakerkids.org/makerkids-project-info/project-1-post-3-smart-bird-feeder-smart-house-technology.
Wingscapes Birdcam Pro Birdcam Mounting Arm; Publication date: unknown www.wingscapes.com/wingscapes-birdcam-monting-arm.

\* cited by examiner

SYSTEM FOR FEEDING AND PHOTOGRAPHING WILDLIFE

BACKGROUND

Viewing and photographing birds is a popular avocation and a vocation. Many photographers, both amateur and professional, are attracted to the science and wonders of nature and to birds in particular. Many strive to capture images of birds in flight, birds feeding and birds as close as can be in their natural environments. In particular, amateur ornithologists are well served by things that attract birds to their location, bird feeders for example. Motion and heat sensitive devices have been used to detect and photograph animals including birds.

SUMMARY

This invention provides simple and inexpensive devices to simultaneously attract and photograph birds or other wildlife. The invention also provides a system by which several feeding installations are usable with one or more removable photographic modules. Each module incorporates a motion and/or heat sensor and an imaging device operative in response to the output of the sensor. The imaging device may be a camera, a digital imaging device or the like which are collectively referred to herein by the term "camera".

One embodiment of this invention provides a feeding and photographing apparatus which incorporates feed storage, a sensor for detecting the presence of one or more birds or other small animals such as squirrels in the vicinity of the stored food, a camera operative in response to output of the sensor to take one or more pictures, a feeding station within the field of view of the camera and the sensor, and, optionally, a dispenser for delivering stored food to the feeding station. When birds or other wildlife are attracted to the food and active in the vicinity their motion or their presence is sensed by the sensor which activates the camera to initiate photography of birds or other wildlife within the field of view of the camera. The system can, with respect to birds, photograph birds feeding at the feeding station and birds in flight nearby.

Multiple feeders, two or more, can be provided in an area to attract to the area a greater number of wildlife or a greater variety of birds. For example one feeder can store food such as seeds attractive to birds such as finches or cardinals, a second feeder can store nectar attractive to hummingbirds and a third could have food that targets squirrels. Each feeder is adapted to receive a removable photographic module that houses the motion and/or heat sensing function and the photographic function. Thus one photographic module can be shared in turn by the several feeders. Also photographic modules with different sensing and photographic characteristics can be available to alter the responsiveness and type of photography occurring at a particular feeder.

DETAILED DESCRIPTION OF THE DRAWINGS

Figure 1:
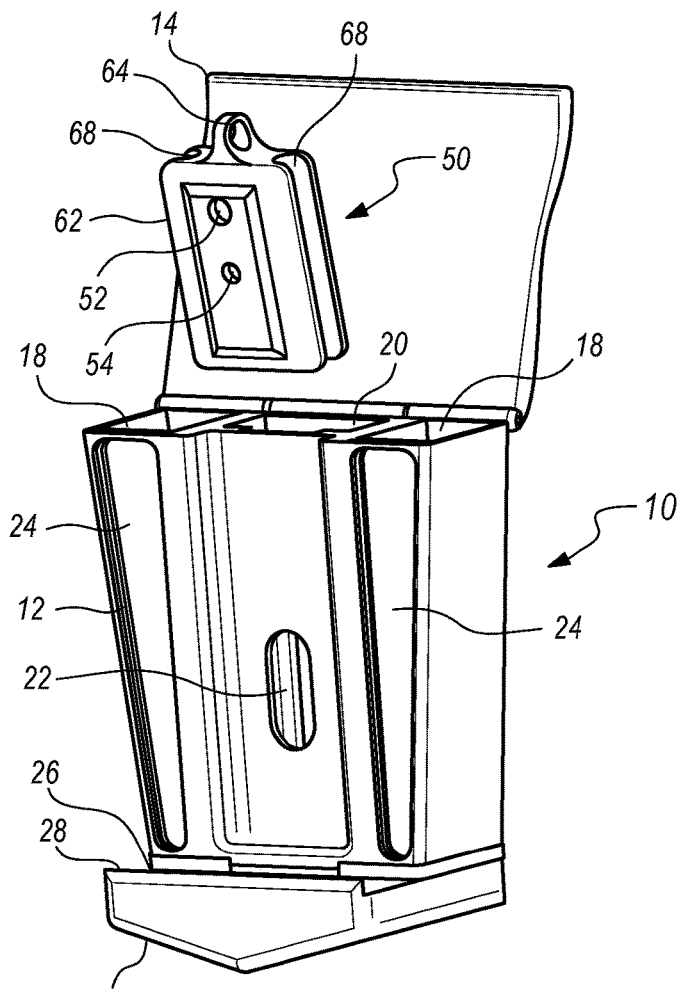
FIG. 1 shows a feeder for solid feed with a photographic module in position to be installed.

The feeder 10 of FIG. 1 incorporates a housing 12, a hinged lid 14 and a base element 16. The feeder 10 is associated with a unitary photographic module 50 having an aperture 52 for a motion or heat detector and a second aperture 54 for a camera. The housing 12 of the feeder 10 is made of molded plastic and forms feed storage chambers 18 with a sleeve 20 situated between the chambers. The sleeve 20 is configured to receive the photographic module 50 and incorporates an elongated oval opening 22 that registers with the apertures 52 and 54 on the module. Each of the storage chambers 18 in the feeder 10 has a transparent window 24 through which the feed level is visible. The base element 16 forms a feeding station with a feed tray 26 and a perch 28. The chambers 18 in the housing 12 are open at the bottom to dispense the seed or other particulate or granular food by gravity from the chambers 18 to the feed tray 26. Food in the tray 26 is accessible from the perch 28. The sleeve 20 forms a structure that mounts and positions the module 50 so the feed tray 26 and perch 28 and the area surrounding them are within the fields of view of a sensor 56 and a camera 58. The feeder 10 may be mounted vertically on a pole or wall or hung from an overhanging support. Non-granular foods such as suet cake may be placed in the feeding station. It will be understood that when food not amenable to gravity flow, such as suet cake, is placed in the feeding station the food chambers 18 are not used.

Figure 1A:
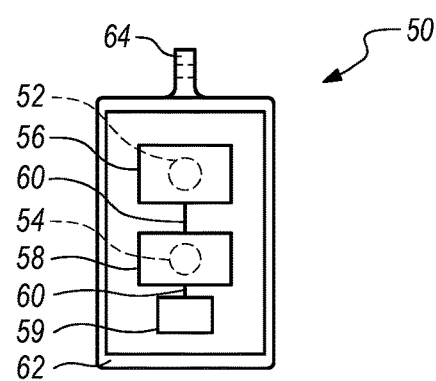
FIG. 1A is a view of the reverse side of the photographic module with the back open.

Referring to FIG. 1A, the photographic module 50 includes a motion and/or heat sensor 56, a camera 58 and a rechargeable power source 59. The sensor 56 electrically communicates with the camera 58 by wire 60 or by a wireless communication system. Power source 59 supplies power to the sensor 56 and the camera 58. A cover 62 encloses the sensor 56, camera 58 and power source 59. One example of a suitable motion and/or heat sensor is a pyroelectric infrared (PIR) sensor. This and other such sensors will detect the presence of target objects (subjects such as birds or other wildlife) within a defined or known field of view. An example of a suitable camera is a 3MP camera with a removable mini SD Card memory. The sensor 56 senses the field of view through the aperture 52 formed in the cover 62 and the camera 58 is exposed to the field of view through the aperture 54 which is also formed in the cover 62. The sensor 56 and the camera 58 are situated or arranged in the cover 62 so the field of view of the sensor 56 and the field of view of the camera 58 overlap and may be approximately the same. When the module 50 is in use the fields of view include the area surrounding the feed tray 26. Ideally, the fields of view coincide or the field of view of the camera 58 will be slightly larger than that of the sensor 56. (If the sensor has a larger field of view than the camera it will signal the camera to take pictures when nothing of interest is within the camera's field of view.) The sleeve 20 in the feeder 10 and the cover 62 for the module 50 have complementary shapes. The sleeve 20 and the cover 62 also have a dimensional tolerance that permits easy insertion and removal of the module 50 into and out of the sleeve 20 while also holding the module secure in the sleeve to prevent unwanted relative motion between the module 50 and the housing 12. A lifting element 64 including an opening 66 is formed in the top portion of the cover 62 to facilitate installation of the module 50 in the sleeve 20 and its removal. The covers 62 for the modules 50 are weather sealed so the modules can be left in place and function is all weather conditions. Slots 68 in opposing sides of the cover 62 do not function in the embodiment of FIG. 1 but function as will be explained in connection with FIGS. 3 and 4.

The function of embodiment of FIG. 1 now will be described. When the chambers 18 are filled with seed or other granular food, the food is fed by gravity to the feeding tray 26. Birds can alight on the perch 28 and eat food in the feeding station or tray 26. The sleeve 20 and the module 50 interlock via their complementary shapes; their interconnection so confines the module that the sensor 56 and the camera 58 are directed toward the feed tray 26 with the feed tray and an area surrounding it within the field of view of the camera 58 and sensor 56. The sensor 56 detects the presence of the birds as they become active in the field of view and as they feed at the tray 26. As the sensor detects the presence of birds in the field of view it provides a signal; the camera 58 in response to the signal initiates a photographic function. Pictures can be taken singly, at intervals or a video can be taken as long as the presence of birds is detected. Images taken are stored by a memory card (not shown) and/or transmitted to a remote location. The memory card may be internal or removable and may be for either or both of still images or video recordings.

Figure 2:
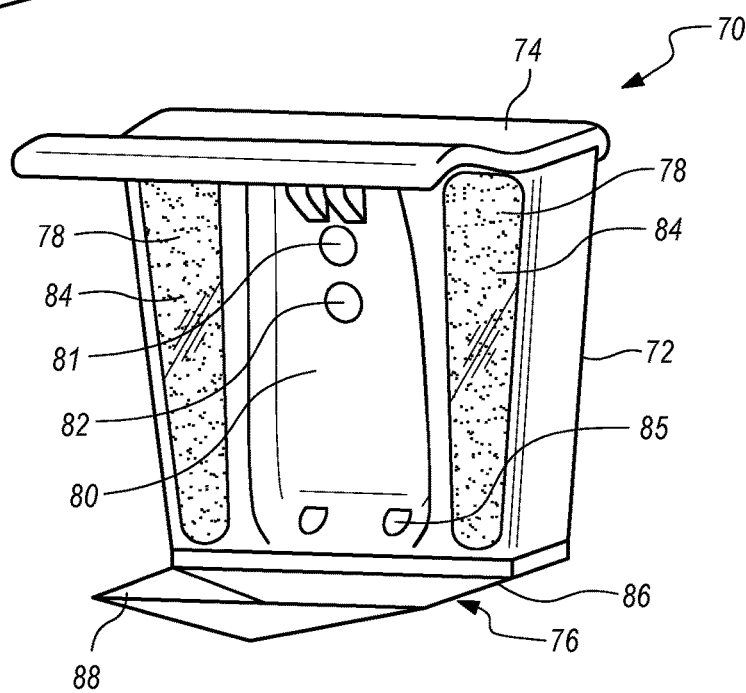
FIG. 2 is an alternate embodiment showing a bird feeder for solid feed.

FIG. 2 shows another example of the feeder. The feeder 70 incorporates a housing 72, a hinged lid 74 and a base element 76. The housing 72 forms two feed storage chambers 78, each with a transparent window 84 through which the food level is visible. A panel 80 situated between the feed storage chambers 78 covers the sleeve or other structure that receives and positions a photographic module 50. Two openings 81 and 82 are formed in the panel 80 and located to register with apertures 52 and 54, respectively, in the cover 62 when the module 50 is installed in the sleeve (not shown in FIG. 2; see FIGS. 1 and 1A) located behind the panel 80. The sleeve is configured to receive the photographic module 50 and position it higher within the housing 72 than it is positioned in the case of the housing 12 shown in the embodiment of FIG. 1. The base element 76 is connected to the housing 72 with screws at the location 85 and forms a feeding station in the form of a feed tray 86. A perch 88 is situated along the edge of the tray 86. The chambers 78 in the housing 72 are open at the bottom to allow the seed or other food to pass by gravity from the chambers 78 to the feed tray 86. Food in the tray is accessible to birds on the perch 88. The feed tray 86 extends further out from its housing than does the feed tray 26 in the embodiment of FIG. 1. This locates the perch 88 in the embodiment of FIG. 2 further from its housing 72 than the perch 28 in the embodiment of FIG. 1 is from its housing 12. In the embodiment of FIG. 2 the location of perch 88 and the higher location of the module 50 make the embodiment more suitable for relatively large birds like the cardinal while the embodiment of FIG. 1 may be more suitable for relatively small birds like finches.

The function of embodiment of FIG. 2 now will be described. When the chambers 78 are filled seeds or other solid food, the food is fed by gravity to the feed tray 86. Birds can alight on the perch 88 and eat food in the tray 86. The module 50 is oriented behind the panel 80 so that the sensor 56 and the camera 58 are directed toward the feed tray 86 and the area surrounding the feed tray is within the field of view of both the camera and sensor. The sensor 56 detects the presence of the birds as they become active in the field of view and as they feed at the tray 86. As the sensor detects the presence of birds in the field of view it provides a signal; the camera 58 in response to the signal initiates a photographic function. Pictures can be taken singly, at intervals or a video can be taken as long as the presence of birds is detected. Images taken are stored by a memory card (not shown) and/or can be transmitted to a remote location.

Figures 3, 4:
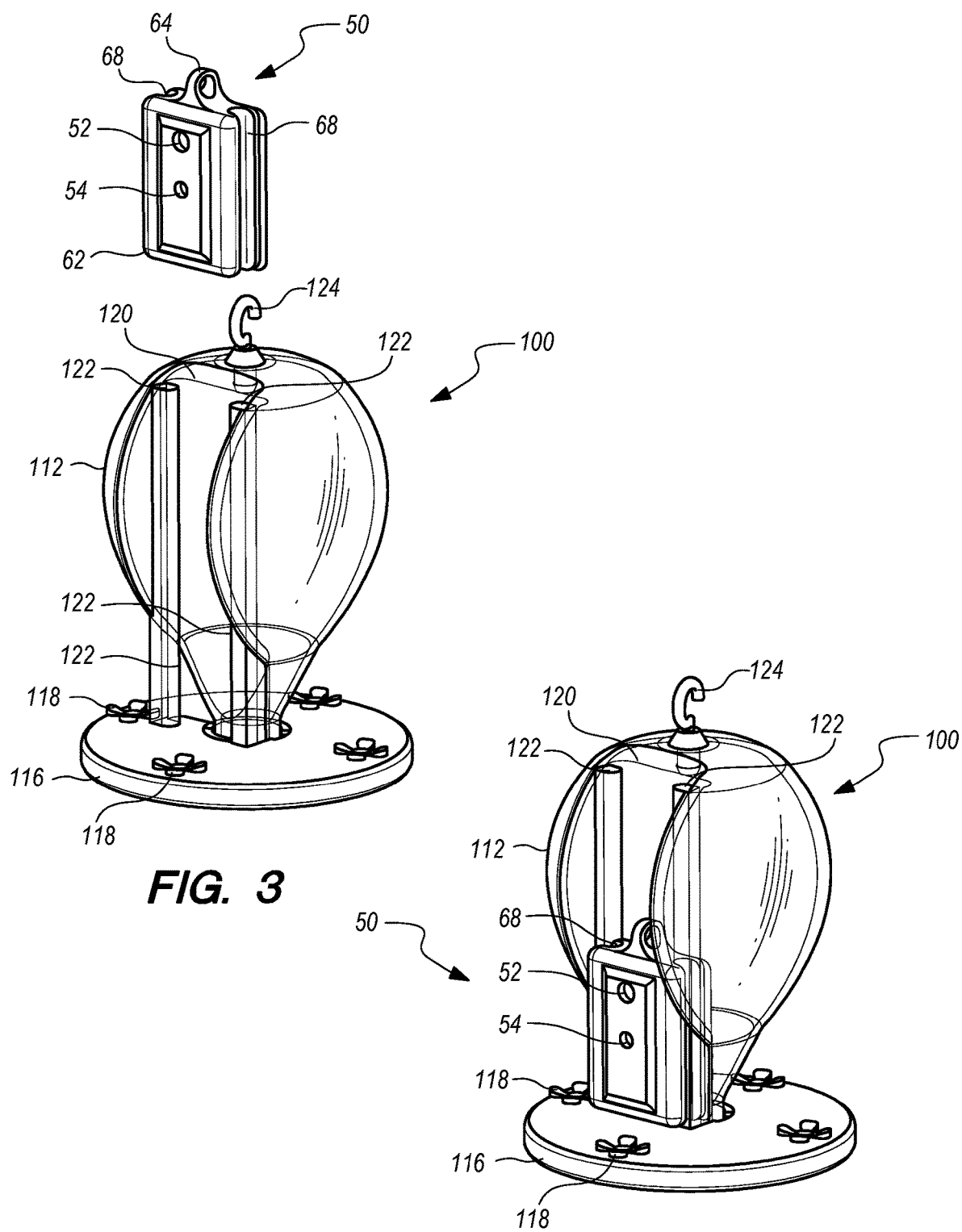
FIG. 3 is a nectar feeder with a photographic module in position to be installed.
FIG. 4 is the nectar feeder of FIG. 3 with a photographic module installed.

FIGS. 3 and 4 illustrate an embodiment of the invention that functions as a hummingbird feeder. FIG. 3 shows the feeder 100 with the photographic module 50 in position to be installed. FIG. 4 shows the feeder 100 with the module 50 installed and held in operative position. The feeder 100 incorporates a clear globe 112 forming a reservoir for nectar, imitation nectar, sugar water or other liquid food. The globe 112 is connected to a base 116 in which one or several feeding stations 118 are installed. Liquid food in the globe 112 is fed by gravity to the feeding stations 118. The globe 112 is configured to form a channel 120 with tongue-like rails 122 along opposing inner sides of the channel. The channel 120 and rails 122 conform to the size and shape of the photographic module 50 so that during installation of the module the rails 122 engage the groove-like slots 68 in the opposing sides of module cover 62 and guide the module 50 into operative position where it rests on the base 116. The rails 122 are configured to be complementary to the shape of the slots 68. The rail and slot (tongue and groove) arrangement forms an interlocking (i.e.: interconnected) structure to mount and position the module 50 on the feeder 100 so it is securely confined in the operative position where at least one of the feeding stations 118 is in the field of view of the sensor 56 and the camera 58. Slots 68 can be either on opposite sides of the module 50 (as shown) or could be along opposing inner faces of the channel 120 with the complementary mating rail being on the opposite sides of the module 50. The apparatus can have one, two or more sets of mating rails and slots. A hook 124 allows the feeder 100 to be hung from a convenient support. The embodiment of FIGS. 3 and 4 functions in a similar manner to the embodiments of FIGS. 1 and 2. Hummingbirds typically feed on the wing and do not perch. The presence and movement of hummingbirds within the field of view of the sensor 56 is detected and the sensor 56 signals the camera 58 to commence photography.

The photographic module 50 is universal to multiple embodiments and can be used interchangeably among the various feeders, such as those shown as 10, 70, 100 and 200. Correspondingly, the feeders accept various modules 50. This allows the specifications for and functionality of the camera 58 and sensor 56 vary from one module 50 to another. That is, the sensitivity of the sensor 56 and the resolution and other settings for the camera 58 may vary from one module 50 to another to adapt to different wildlife or birds, different conditions and various desired photographic outcomes. The removability of the modules 50 from the feeders enables the modules to be conveniently serviced. When a module 50 is removed from a feeder data stored on an internal memory card (not shown) may be downloaded and the power source 59 can be recharged. Any debris that accumulates on the module can be removed and the lens for camera 58 and the window for sensor 56 can be cleaned.

Figure 5:
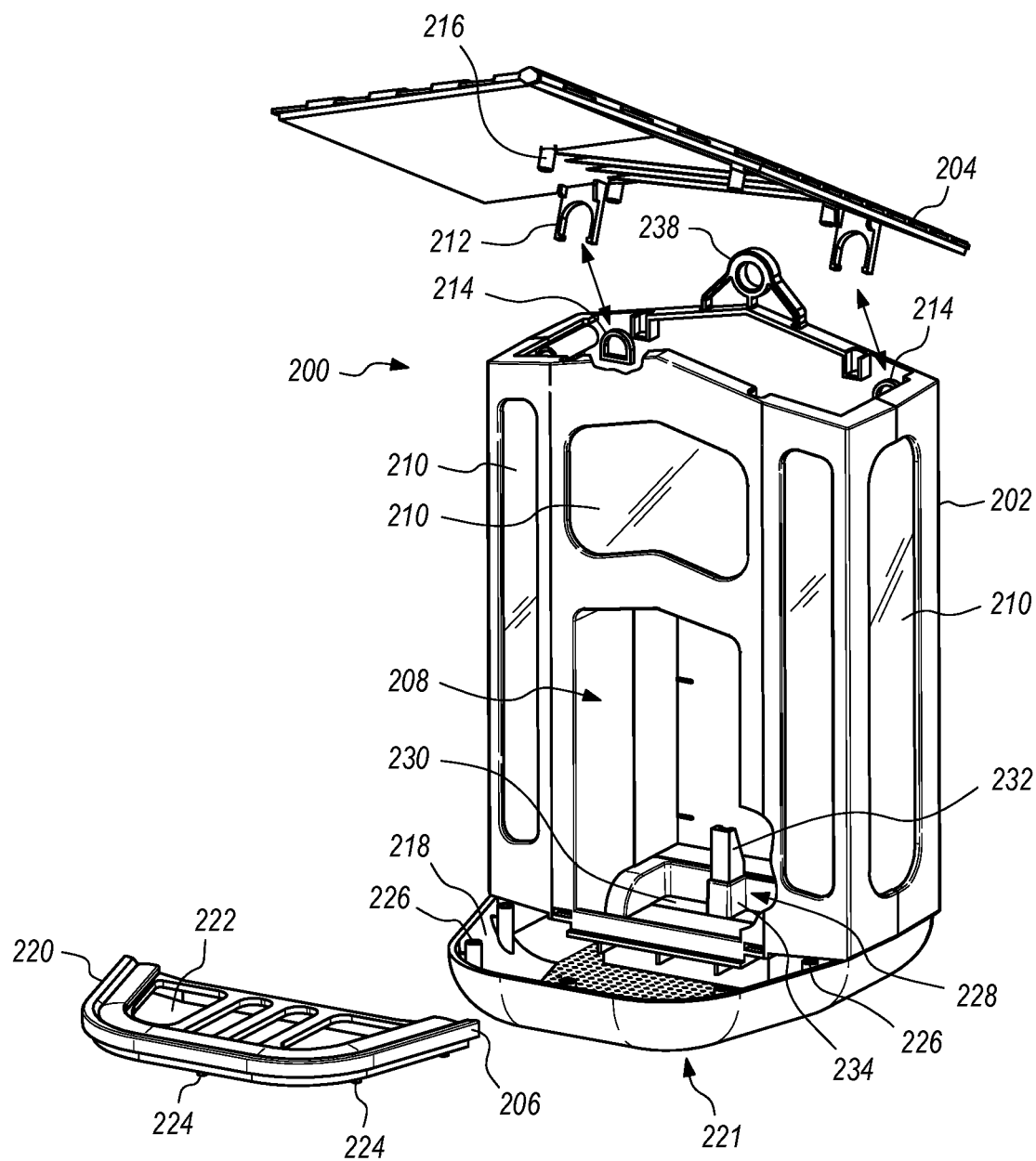
FIG. 5 is a partially broken away perspective view of an embodiment of the invention with certain parts removed.
Figure 6:
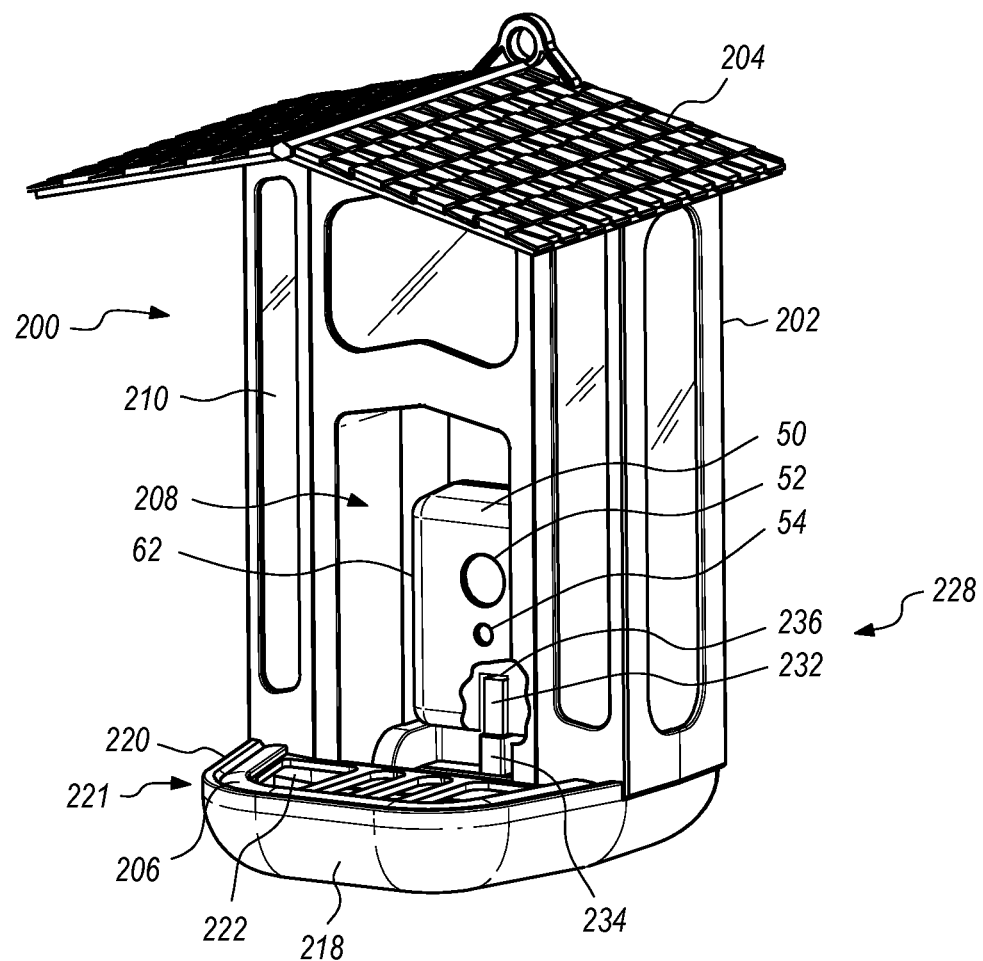
FIG. 6 is a partially broken away perspective view of the fully assembled embodiment of FIG. 5.

FIGS. 5 and 6 show an embodiment in which a bird feeder 200 incorporates a body or housing 202, a cover 204 and a grate 206. The body 202 forms a cavity 208 for receiving a module 50 in a manner hereafter described. The volume above and along each side of the cavity 208 forms a receptacle and storage chamber 210 for bird seed or the like. As shown by FIG. 5, the cover 204 and grate 206 are mounted on the body 202 to be easily removable; this facilitates cleaning and ease in filling the chamber 210 with food. The cover 204 is positioned on the body 202 and attached to it by means of spring clips 212 formed on the cover 204 and anchors 214 on the housing 202. Projections 216 further position and stabilize the cover 204. The cover when in place is removed by simply lifting it off the body overcoming the grip of the clips 212. The grate 206 covers a feed tray 218 formed in the body 202 below the bird food storage chamber 210. The grate includes a perch 220 along the rim and openings 222 that provide access to food in the tray 218. The grate 206 is positioned in alignment with the food tray 218 by feet 224 on the grate and complementary supports 226 in the tray. When in place the grate 206 is removed by lifting it off the tray 218. The grate 206 and feed tray 218 form a feeding station 221.

As further shown by FIGS. 5 and 6, a mounting structure 228 includes a post 232 and a sleeve 236. The post 232 is fixed in the body 202, within the cavity 208 and extends upward from and substantially perpendicular to the bottom 230 of the body. The post 232 is joined by a base 234 to the bottom 230 of the body 202. Referring to FIG. 6, a sleeve 236 in the module 50 is adapted to receive the post 232. The sleeve and post are complementary so that together they form a connection between the module 50 and the feeding station 221. The post 232 and sleeve 236 mate in an interlocking or interconnected fashion for holding the module 50 and the feeding station tray 218 together with the module 50 confined in a position so that the area surrounding the feeding station 221 is within the fields of view of both the sensor 56 and the imaging device or camera 58. The mounting structure 228 may be configured with the post 232 on either the feeding station 221, as shown, or the module 50 and with the sleeve 236 on the other of the module and the feeding station.

The module 50 is installed on the feeder 200 by placing the module in the cavity 208 so the sleeve 236 aligns with the post 232 and the post 232 is introduced into the sleeve 236. The module 50 is brought to rest on the base 234. The complementary shapes of the post and sleeve are such as to position the module with respect to the feeding station 221 so that the feeding station is within the fields of view of the sensor 56 and camera 58. Birds or other wildlife at the feeding station 221 will be sensed by the sensor 56 which activates the camera 58 to photograph subjects within the field of view at the feeding station. A hanger 238 provides a convenient means to mount the feeder 200 on a vertical surface such as a post or wall or suspend it from an overhead structure. The feeder is mounted in a vertical orientation so granular feed and the like will flow or travel by gravity from the storage chamber 210 to the feeding station 221.

The invention is described in connection with several preferred embodiments which are not intended to limit the scope of the invention. The invention is intended to include such alternatives and equivalents as are and may be defined by the following claims.

The invention claimed is:

1. Apparatus for feeding and photographing wildlife comprising:
   an imaging device defining a field of view;
   a housing comprising a vertically oriented food storage and a bottom portion beneath the food storage;
   a feeding and photographing station located at the bottom portion so that food is fed by gravity from the food storage to the feeding and photographing station, the feeding and photographing station being positioned to be within the field of view of the imaging device when the imaging device is positioned to photograph subjects;
   a sensor for detecting the presence of subjects within the field of view, the imaging device being operative in response to output from the sensor for photographing subjects within the field of view;
   a unitary module adapted to contain the imaging device and the sensor so the imaging device and the sensor have overlapping fields of view; and
   complementary post and sleeve structure for removably holding and orienting the module within the housing so the imaging device and the sensor when held and oriented are directed toward the feeding and photographing station to photograph subjects within the field of view, the post and sleeve structure comprising post means and complementary sleeve means which mate for holding the module and the housing together with the module in position so that the area surrounding the feeding and photographing station is within the fields of view of the sensor and the imaging device, the post means being affixed to either the housing or the module and configured to extend either upwardly from the bottom portion of the housing or from the module and the sleeve means being fixed to the other of the module and the bottom portion.

2. Apparatus according to claim 1 wherein the post means comprises a post extending vertically upward from the bottom portion and the sleeve means comprises a sleeve formed within the module and adapted to receive the post.

3. Apparatus for feeding and photographing wildlife comprising:
   a housing comprising vertically oriented food storage and a bottom portion beneath the food storage;
   means on the housing forming at least one feeding station in the bottom portion beneath the food storage so that food is fed by gravity from the food storage to the feeding station;
   a removable module containing a sensor for detecting the presence of wildlife within a field of view and an imaging device operative in response to the sensor, the sensor and imaging device being arranged so that the sensor and the imaging device have overlapping fields of view; and
   a mounting structure for positioning the module within the housing so an area surrounding at least one feeding station is within the fields of view of the sensor and the imaging device, wherein the mounting structure comprises a post element affixed to the housing and extending upwardly from the bottom portion adjacent the feeding station and a complementary sleeve formed in the module and adapted to receive the post element for holding the housing and the module together when the module is placed onto the housing so the sleeve aligns with and receives the post element and for permitting the module to be lifted off the post element to remove the module from the housing.

4. Apparatus according to claim 3 wherein the housing comprises a reservoir for liquid food storage.

5. A system for feeding and photographing birds comprising:
   a module incorporating an imaging device and a sensor for detecting the presence of birds within a field of view, the imaging device and the sensor being positioned within the module so the fields of view of the sensor and the imaging device overlap wherein the module comprises a first structural element adapted to mount and position the module; and at least one bird feeder comprising at least one feeding station and a second structural element on the at least one bird feeder adapted to mount and position the module on the at least one bird feeder;

wherein the first and second structural elements are complementary and mate for holding together the module and the bird feeder on which the module is mounted with the module in a position so that an area surrounding the at least one feeding station of the bird feeder on which the module is mounted is within the fields of view of the sensor and the imaging device; the first structural element comprising either a post, affixed to the module and extending therefrom, or, fixed on the module, a complementary sleeve adapted to engage the post and the second structural element comprising the other of the post, affixed to the at least one bird feeder and extending therefrom, or, fixed on the at least one bird feeder, the complementary sleeve adapted to engage the post.

6. A system according to claim 5 wherein the at least one bird feeder comprises two or more bird feeders wherein each feeder comprises a second structural element adapted to mount and position the module so the at least one feeding station is within the overlapping fields of view of the sensor and the imaging device.

7. A system according to claim 5 wherein the sleeve is formed within the module and the post extends from the at least one bird feeder for engaging the module and positioning the module relative to the at least one feeding station.

8. Apparatus for feeding and photographing birds comprising:

a housing comprising a vertically oriented food storage means and one or more feeding stations beneath the storage means for receiving food from the storage means by gravity flow;

a module containing a sensor for detecting the presence of birds within a field of view and a camera operative in response to output from the sensor, the sensor and the camera being configured within the module so the sensor and the camera have overlapping fields of view;

a first structural element fixed on the housing adapted to mount the module on the housing and position the module with respect to at least one of the one or more feeding stations, the first structural element comprising either a mounting post, extending from the housing, or a complementary sleeve, formed in the housing, adapted to receive the mounting post; and a second structural element fixed on the module and comprising the other of the mounting post extending from the module, or the complementary sleeve, formed in the module;

wherein the mounting post and complementary sleeve interconnect for holding together the module and the housing and for positioning the module on the housing so that the area surrounding at least one feeding station is within the fields of view of the sensor and the camera.

9. Apparatus according to claim 8 wherein the post extends vertically upward from adjacent the one or more of the feeding stations beneath the storage means and the sleeve is formed within the module.

* * * * *